United States Patent
Murugan et al.

(10) Patent No.: US 8,043,545 B2
(45) Date of Patent: Oct. 25, 2011

(54) METHODS AND APPARATUS TO EVENLY CLAMP SEMICONDUCTOR SUBSTRATES

(75) Inventors: Selvarajan Murugan, Kuala Lumpur (MY); Abdul Rahman Mohamed Rafaie, Ipoh (MY)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/967,863

(22) Filed: Dec. 31, 2007

(65) Prior Publication Data

US 2009/0166923 A1 Jul. 2, 2009

(51) Int. Cl.
*B29C 45/14* (2006.01)

(52) U.S. Cl. ......... 264/272.17; 264/271.11; 264/271.13; 264/271.15; 264/279.1; 425/572; 425/116; 425/111; 425/125

(58) Field of Classification Search ............. 264/272.17, 264/469; 425/572, 116, 111, 125
See application file for complete search history.

(56) References Cited

U.S. PATENT DOCUMENTS

| | | | |
|---|---|---|---|
| 4,599,062 A * | 7/1986 | Konishi | 425/116 |
| 4,818,204 A | 4/1989 | Nakagawa | |
| 4,867,663 A * | 9/1989 | Woerner et al. | 425/111 |
| 4,915,607 A | 4/1990 | Medders | |
| 5,118,271 A | 6/1992 | Baird | |
| 5,366,368 A | 11/1994 | Jang | |
| 5,454,705 A | 10/1995 | Back | |
| 5,766,650 A * | 6/1998 | Peters et al. | 425/116 |
| 6,007,317 A * | 12/1999 | Mess | 425/125 |
| 6,120,274 A * | 9/2000 | Gerig et al. | 425/116 |
| 6,439,869 B1 | 8/2002 | Seng | |
| 7,148,083 B2 | 12/2006 | Kinsman | |
| 2001/0040316 A1* | 11/2001 | Stewart | 264/469 |
| 2007/0087079 A1 | 4/2007 | Murugan | |

FOREIGN PATENT DOCUMENTS

| | | | |
|---|---|---|---|
| JP | 05104585 A | * | 4/1993 |
| JP | 2001030311 A | * | 2/2001 |
| WO | 2006129907 | | 12/2006 |

OTHER PUBLICATIONS

"Semiconductor Packaging Assembly Technology," National Semiconductor, Aug. 1999 (8 pages).

* cited by examiner

*Primary Examiner* — Philip Tucker
*Assistant Examiner* — Vicki Wu
(74) *Attorney, Agent, or Firm* — Yingsheng Tung; Wade J. Brady, III; Frederick J. Telecky, Jr.

(57) ABSTRACT

Methods and apparatus to evenly clamp semiconductor substrates in a transfer mold process are disclosed. A disclosed split mold base includes a first plate having a first surface, a second plate having a second surface opposite the first surface, and a plurality of springs that are disposed between the first and second plates to distribute a clamping pressure applied by a mold press.

8 Claims, 6 Drawing Sheets

METHODS AND APPARATUS TO EVENLY CLAMP SEMICONDUCTOR SUBSTRATES

FIELD OF THE DISCLOSURE

The present disclosure relates generally to semiconductor fabrication and, more particularly, to methods and apparatus to evenly clamp semiconductor substrates in a transfer mold process.

BACKGROUND

Integrated circuits are made on thin wafers (e.g., silicon, silicon carbide, sapphire, etc.) and include a plurality of contacts to interface with other circuits and devices. To facilitate coupling integrated circuits into electronic systems and protect them from the environment, the integrated circuits are attached to a substrate (e.g., a lead frame) and are then encapsulated into a mold (e.g., epoxy resin) that includes one or more electrical contacts (e.g., leads, solder balls, bumps, contacts, etc).

To encapsulate integrated circuits, one or more semiconductor devices attached to a lead frame are clamped at high pressures (e.g., 2500-3000 psi) into a mold chase having channels in communication with one or more gates. Generally, the mold chase is formed by clamping two mold bases together with a mold press. The mold chase includes cells with one or more corresponding integrated circuits of the lead frame contained therein. The mold chase is clamped at high pressure to prevent a liquid mold compound injected into the mold chase from bleeding out of cells contained therein.

A solid mold compound is supplied to the mold chase. A plunger applies pressure to the mold compound, causing the solid mold compound to convert into a liquid mold compound. The pressure from the plunger forces the liquid mold compound into the channels of the mold chase such that the liquid mold fills the cells of the mold chase via the gates associated with the channels. The liquid mold flows into the cells of the mold chase and fills the same to thereby encapsulate the integrated circuits of the lead frame. After a time, the liquid mold within the cells cures to form rigid housing(s) over the lead frame(s) and the associated integrated circuit(s).

In conventional mold systems, a main cylinder provides a clamping pressure to center the mold chase. Newer mold systems include a main cylinder and auxiliary cylinders that provide clamping pressure to one or more sides. The mold chases may also include support structures (e.g. pedestals) on one or more surfaces. To distribute clamping pressure in such mold chases, shimming of up to 0.2 mm may be inserted between the support structures.

SUMMARY

Methods and apparatus to clamp semiconductor substrates in a transfer mold process are disclosed herein. An example mold base includes a first plate having a first surface and a second plate having a second surface that is opposite the first surface. In some examples, a plurality of springs are disposed between the first and second plates. In such examples, the springs distribute a clamping pressure applied by an external source such as a mold press.

DETAILED DESCRIPTION

Example methods and apparatus to clamp semiconductor substrates in a transfer mold process are disclosed herein. Although the example methods and apparatus described herein generally relate to semiconductor packages, the disclosure is not limited to semiconductors. On the contrary, the teachings of this disclosure may be applied in any device or process which would benefit from balanced pressurization, for example, injection molding.

Figure 1:
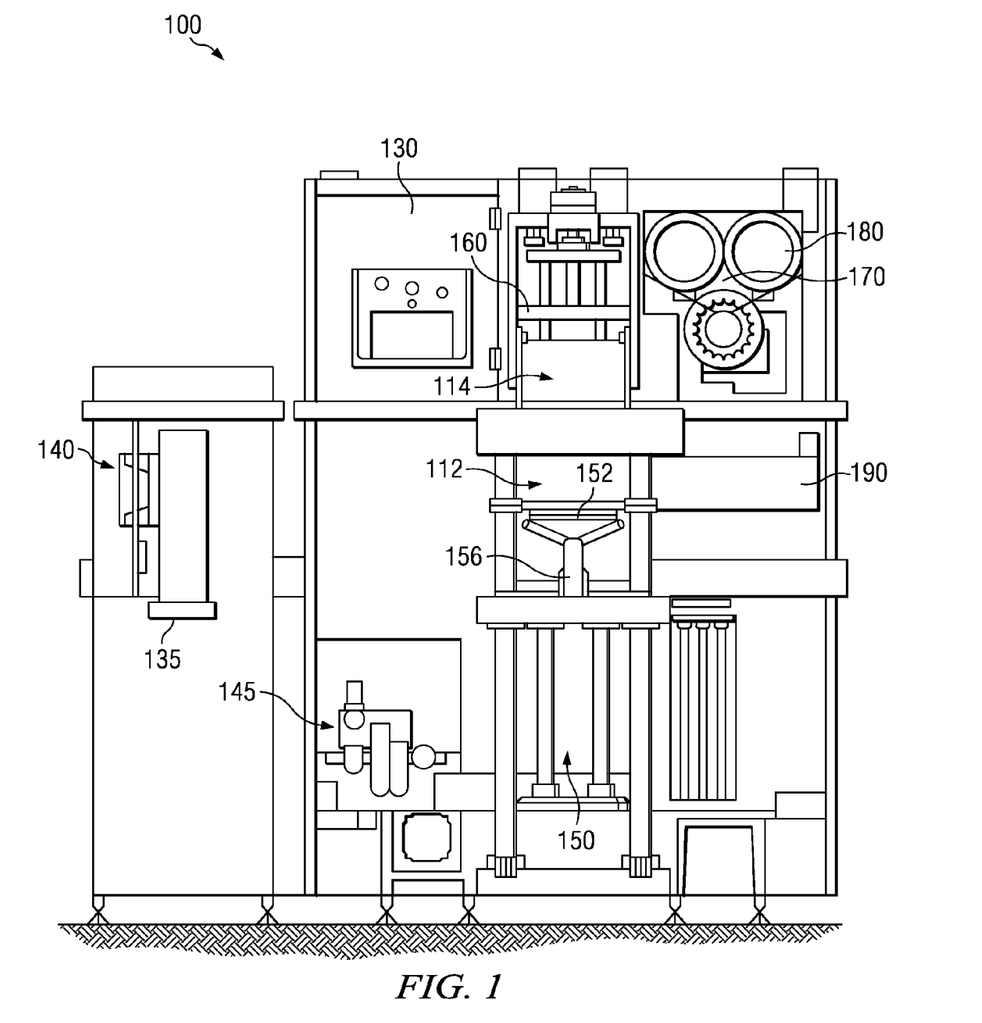
FIG. 1 illustrates an example mold system.

FIG. 1 illustrates an example mold system 100 to implement an automated transfer mold process. Generally, in the example of FIG. 1, the mold system 100 includes a chase one or more substrates (e.g., a lead frame, etc.) with one or more integrated circuits attached to the substrate(s). In the example of FIG. 1, a first chase section 112 and a second chase section 114 are disposed within the example mold system 100. The chase sections 112, 114 will cooperate to form the mold chase 110. The mold system also includes a controller 130, a loader 135, a chase feed system 140, a vacuum motor 145, a mold press 150, a mold source system 160, a mold feed system 170, a mold supply 180, and an unloader 190.

Figure 2A:
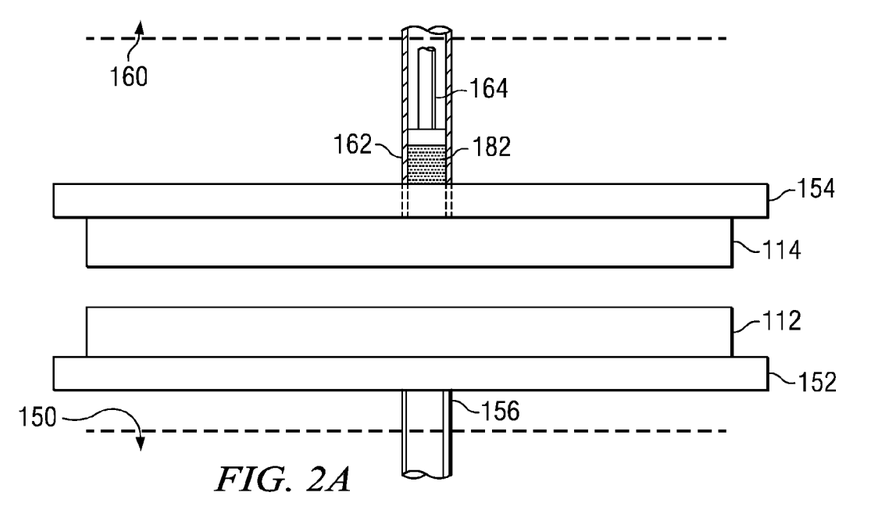
FIGS. 2A-2B illustrate an example mold chase of the mold system of FIG. 1.

In the example of FIG. 1, the controller 130 configures and controls the devices (e.g., the vacuum motor 145, etc.) of the example mold system 100. The example loader 135 loads the mold chase section 112 onto the chase feed system 140. The chase feed system 140 may be implemented by, for example, a servo motor system that moves the first chase section 112 within the example mold system 100. As illustrated in the example of FIG. 2A, the mold chase section 112 is conveyed to the mold press 150 where the first mold chase section 112 is placed onto a mold base 152. In some examples, the second mold chase section 114 is attached to a second mold base 154. As illustrated in the example of FIG. 2B, after positioning the first mold chase section 112 beneath the second mold chase section 114, one or more hydraulic cylinders 156 of the mold press 150 are actuated to forcibly press the mold chase sections 112, 114 together, thereby sealing and forming the mold chase 110 with the integrated circuits encapsulated therein.

The mold base 152 is a generally planar structure that distributes the pressure applied via the hydraulic cylinders 156. In the examples of FIG. 2A-2B, the second mold base 154 is positioned above the first mold base 152. In the illustrated example, the second mold base 154 supports the second mold chase section 114. In other examples, the mold chase 110 may be formed prior to entering the example mold system 100 so that the section chase section 114 is not carried by the second mold base 154. In the illustrated examples, the mold chase sections 112, 114 are in communication with the vacuum motor 145 to enable the vacuum motor 145 to extract air from the mold chase 110. The vacuum motor 145 removes air from the mold chase to facilitate filling of the chase 110 with the mold compound.

Figure 2B:
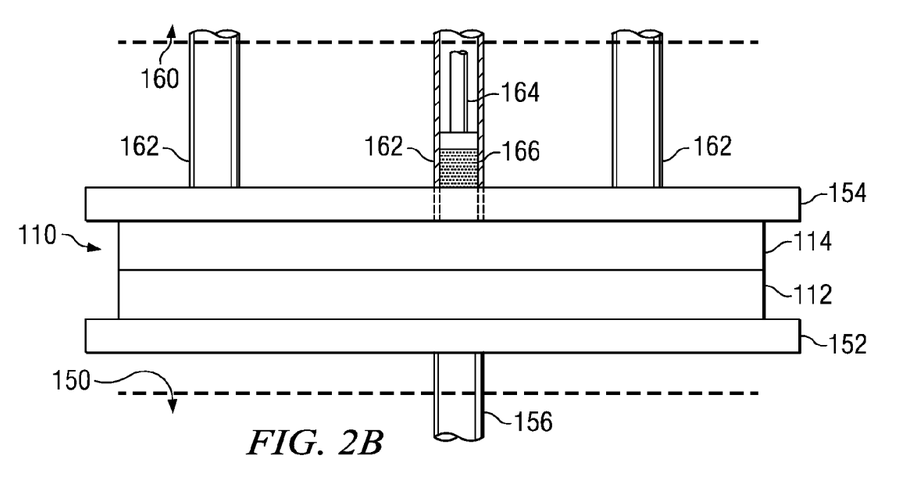

In the example of FIGS. 2A-2B, the mold chase 110 is also in communication with the mold source system 160. The mold source system 160 includes at least one mold source 162 having a plunger 164. In the illustrated example, the mold source system 160 is in communication with a mold feed system 170. The mold feed system 170 is in further communication with a mold supply 180, which stores mold compound 182 (e.g., solid mold tablets). The mold feed system 170 receives and conveys the mold compound 182 to the mold source chamber 162. As illustrated in the example of FIG. 2A, the mold compound 182 is placed in the mold source chamber 162, the plunger 164 then applies pressure to the mold compound 182 within the mold source chamber 162 to convert it into liquid. In the illustrated example, the plunger 164 forces the liquid mold compound into one or more cells 120 within the mold chase 110 and encapsulates the integrated circuits contained therein. After encapsulating the integrated circuits in the mold compound, the mold press 150 releases the mold chase sections 112, 114 and conveys the first mold chase section 112 and the encapsulated integrated circuits to the unloader 190. The encapsulated integrated circuits are removed from the first mold chase section 112 for further processing (e.g., trim and form, singulation, etc.).

Figure 3:
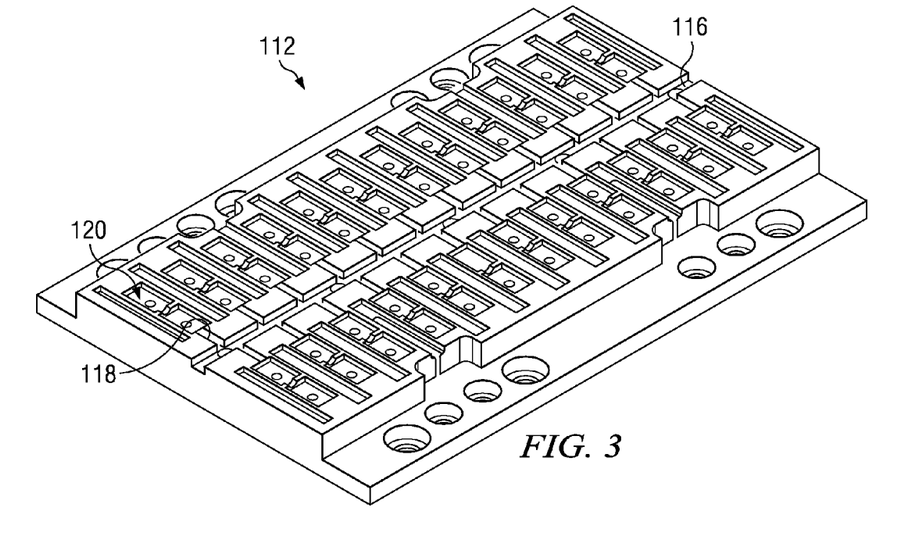
FIG. 3 illustrates a portion of the example mold chase section of FIGS. 2A-2B in more detail.
Figure 4:
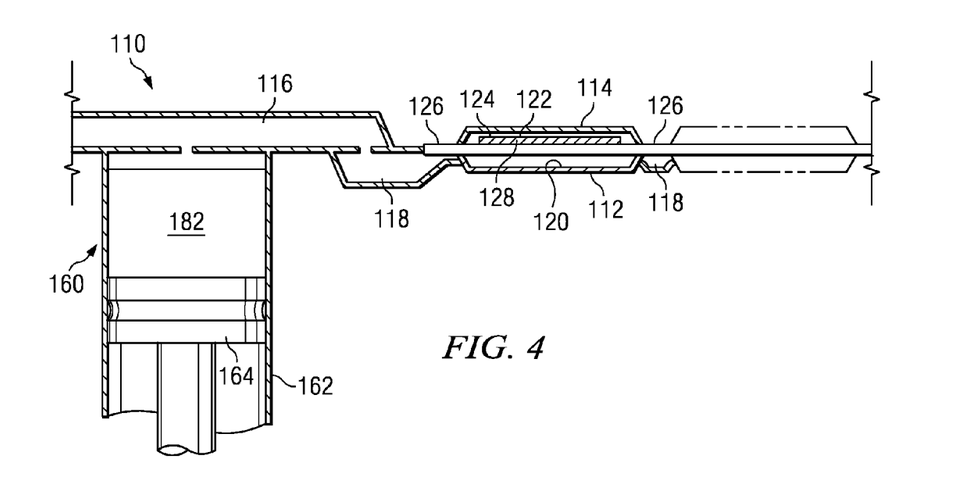
FIG. 4 illustrates a portion of the example mold chase of FIG. 1 in more detail.

FIGS. 3 and 4 illustrate the mold chase 110 in more detail. In the example of FIG. 3, the first mold chase section 112 includes a distribution channel 116 in communication with gates 118. The gates 118 are in communication with the respective cells 120 formed in the chase 110. The second mold chase section 114 may be a mirror image of the first mold chase section 112. As illustrated in the example of FIG. 4, the second mold chase section 114 is forcibly pressed together with the first mold chase section 112 to form the cells 120 within the mold chase 110.

In the example of FIG. 4, at least one substrate 126 (e.g., a lead frame, etc.) having at least one integrated circuit 128 is clamped within the mold chase 110. The substrate 126 includes at least one integrated circuit (not shown) to be encapsulated via the transfer molding process. The substrate 126 is clamped into the mold chase 110 via the mold press 150 with each integrated circuit located in a corresponding cell 120. After the mold chase 110 is clamped in place, the plunger 164 presses the mold compound 182, thereby forcibly converting mold compound 182 into liquid. The distribution system 116 receives the liquid mold compound. As the plunger 164 drives more liquid mold compound into the chase 110, the liquid mold compound flows from the distribution system 116 into the gates 118 and finally into the cells 120, thereby encapsulating the integrated circuits attached to the substrate 126. The liquid mold compound then cures and solidifies to form rigid housing(s) to protect the corresponding integrated circuit(s).

The substrate 126 is clamped between the mold chase sections 112 and 114 in at least one and typically two locations by clamping devices (e.g., hydraulic cylinders 156). In some examples, the clamping pressure applied across the substrate 126 may not be uniform. For example, the mold chase 110 may expand as heat is applied to the mold chase 110 due to thermal expansion. However, the mold chase sections 112 and 114 may not experience uniform temperatures or may not experience uniform expansion. Additionally or alternatively, the mold chase sections 112, 114 may grow over time due to repeated expansion and contraction (e.g., repeated thermal expansion from heating and cooling may cause the mold chase sections 112, 114 to grow). Such growth may not be uniform.

The non-uniform thermal expansion and/or growth of the mold chase sections 112, 114 causes the clamping pressure applied to the substrate 126 to be imbalanced. For example, a temperature difference of 5 to 10 degrees Celsius between portions of the mold chase sections 112, 114 cause the mold chase sections 112, 114 to experience imbalanced clamping pressure. If the clamping pressure is too low in a particular section, the liquid mold compound may bleed onto a portion of the substrate 126 outside of the cell 120 that is clamped, thereby contaminating one or more final packaged integrated circuit(s). In contrast, if the clamping pressure is too high in an area of the mold chase 110, the clamping pressure of the mold chase sections 112, 114 may leave clamp marks or other damage on the substrate 126. Clamp marks on the substrate 126 result in lead frames or leads that are weakened, which may result in destruction of the leads of the final packaged integrated circuit during other operations (e.g., trim and form, singulation, solder reflow, etc.). To address these difficulties, one or both of the mold base(s) 152, 154 of the illustrated example are split into sections to accommodate pressure differences. In other examples, the mold chase may be split into sections to accommodate pressure differences.

Figure 5:
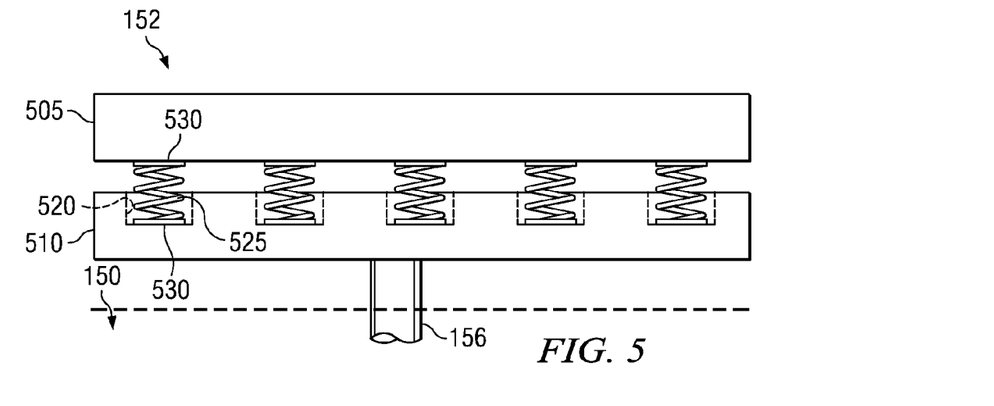
FIG. 5 illustrates an example mold base of the mold system of FIG. 1 in more detail.
Figure 6:
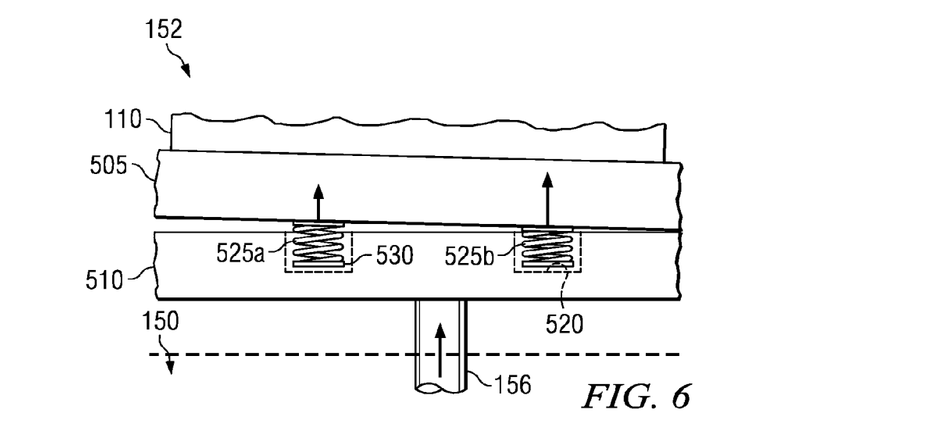
FIG. 6 illustrates the example mold base of FIG. 5 when a force is applied.
Figure 7:
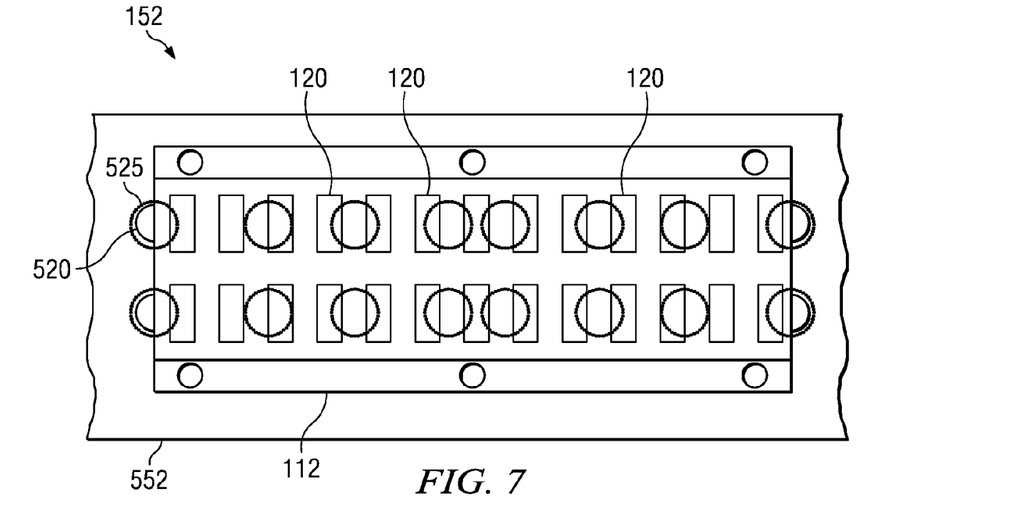
FIG. 7 is a top view of the example mold base of FIG. 5.

FIGS. 5-7 illustrate an example split mold base 152 that may be implemented in the example transfer system 100 of FIG. 1. In the example of FIG. 5, the example split mold base 152 is split into a first plate 505 and a second plate 510. The second plate 510 is attached to a hydraulic cylinder 156 of the mold press 150.

The second plate 510 defines a plurality of recesses 520 that can serve as spring seats. The recesses 520 may be made of any shape or size (e.g., circular, square, etc.). In the example of FIG. 5, each of the recesses 520 is of a size to receive a corresponding spring 225 between the first and second plates 505, 510. The springs 525 are dimensioned such that the first plate 505 and second plate 510 are displaced from each other when in a rest condition (i.e., when no external force is applied thereto). In the example of FIG. 5, the first and second plates 505, 510 are separated by a distance between approximately 0.1 mm and 0.4 mm in the rest condition. Due to these small distances and the high pressure involved, the springs 525 of the illustrated example are disc springs (e.g., material SUS 304, etc.), but any other type of spring (e.g., coil springs, elastomers, spring fingers, quasi-elastic materials, etc.) may be used. In the illustrated examples, washers 530 are located on the ends of the spring 525 to securely mount the springs 525 to the opposing plates 505, 510. Washers 530 may also be present between the springs (e.g., between stacked disc springs 525.

FIG. 6 illustrates the example split mold base 152 of FIG. 5 with the springs 525 under compression (i.e., with an external force applied thereto). The springs 525 assist in more evenly distributing the forces(s) that cause the plates 505, 510 to be forced together. Thus the springs 525 function to distribute the clamping pressure applied to the mold chase 110, thereby alleviating the difficulties associated with imbalanced clamping forces discussed above. In the example of FIG. 6, the springs 525 are configured such that the first and second plates 505, 510 are not in contact with each other when the springs 525 are under full compression. In addition, the springs 525*a-b* of the illustrated example are exaggerated to illustrate a clamping pressure imbalance that causes one of more of the springs 525*a-b* to compress more to distribute clamping pressure. In particular, in the example of FIG. 6, the spring 525b is compressed further than the spring 525a, thereby causing the spring 525b to absorb and distribute more clamping pressure than the spring 525a.

FIG. 7 is a top view of the example split mold base 152 of FIGS. 5-6. In the example of FIG. 7, the springs 525 are placed to improve the distribution of the applied clamping forces. Generally, the springs 525 are placed beneath the cells 120 of the mold chase 110 to provide substantially equal clamping pressure across the substrate 126. Additionally or alternatively, the springs may be placed in closer proximity to the portions of the mold chase 110 that experience a higher clamping pressure, thereby reducing the clamping pressure at that location. For example, in the example of FIG. 7, more springs 525 are placed in the center of the split mold base 152 to better disperse the clamping pressure applied via the hydraulic cylinder 156.

By implementing a split mold base 152 with springs 525 to disperse the clamping pressure applied via the hydraulic cylinder 156, the clamping pressure applied to the substrate 126 is more evenly distributed, thereby forming a better seal between the edges of the chase sections 112, 114. In the example of FIG. 5, the clamping pressure is provided via the hydraulic cylinder 156. When a clamping pressure is applied to the split mold base 152 to clamp a lead frame 126 in a mold chase 110, the springs 525 compress by absorbing a portion of the clamping pressure. As illustrated in the example of FIG. 6, the springs 525 compress to thereby reduce the clamping pressure generated by the hydraulic cylinder 156 by compressing more evenly than prior art approaches. As a result, the split mold base 152 prevents both under-clamping and over-clamping of the substrate 126 by distributing clamping pressure more evenly.

Although the illustrated examples split the lower mold base 152 into two parts, the upper mold base 154 could additionally or alternatively be split into two parts and constructed similar to the mold base shown in FIGS. 5-7. In some example mold systems, the upper mold base 154 accommodates additional moving parts (e.g., ejector pins, etc.) associated with the transfer mold process. Because of these moving parts, it may be difficult to split the upper mold base 154 to balance clamping pressure. Thus, the split mold base of the illustrated example splits only the lower mold base 152. In other examples, depending on the construction of the mold chase due to the density of integrated circuits to be encapsulated, the split mold base may be difficult to implement due to space constraints.

Figure 8:
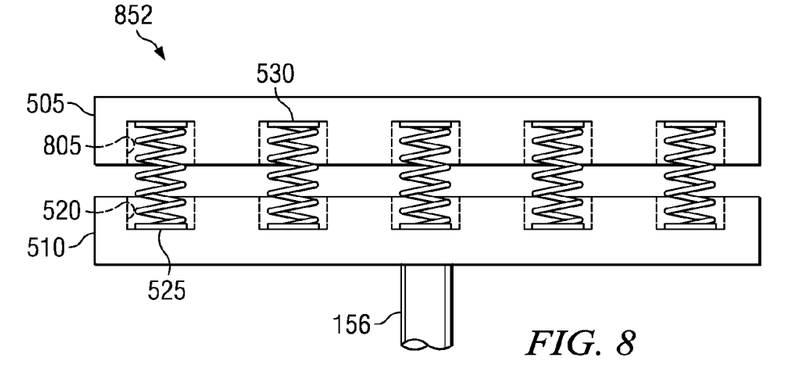
FIG. 8 illustrates another example mold base which may be employed in the example mold system of FIG. 1.

FIG. 8 illustrates another example split mold base 852. In the example of FIG. 8, both the first plate 505 and the second plate 510 of the lower mold base 152 include recesses 520 to seat the spring 525.

Figure 9:
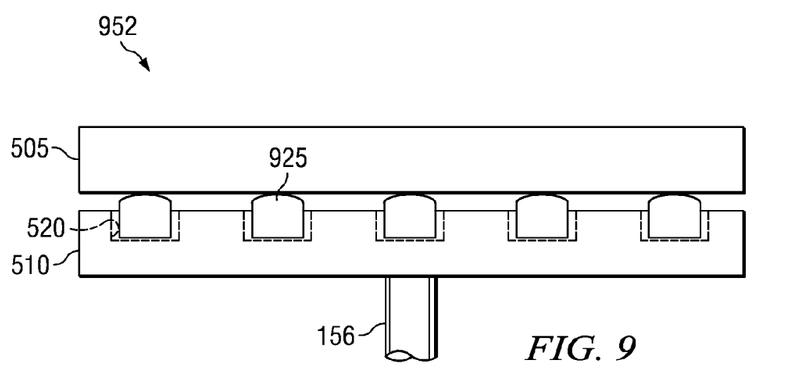
FIG. 9 illustrates another example mold base which may be employed in the example mold system of FIG. 1.

FIG. 9 illustrates another example split mold base 952. In the example of FIG. 9, the springs 525 are implemented by elastomer blocks 925. In this example, the elastomer blocks 925 comprise an elastic material that changes its shape when sufficient force is applied. As a result, under sufficient pressure, the elastomer blocks 925 compress and deform, thereby filling their corresponding recesses 520. The elastomer blocks 925 thereby exert a force on the first plate 505 to distribute the clamping pressure.

Figure 10:
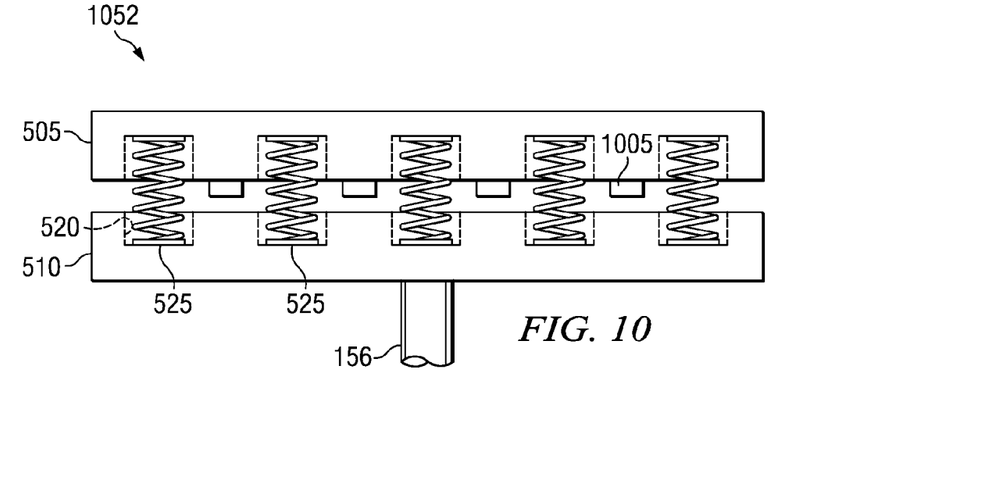
FIG. 10 illustrates another example mold base which may be employed in the example mold system of FIG. 1.

FIG. 10 illustrates another example split mold base 1052. In the example of FIG. 10, the bottom surface of the first plate 505 includes one or more raised portions 1005 (e.g., pedestals or stops). When sufficient force is exerted on the mold base 1052, the raised portion 1005 contact the second plate 505 to prevent the springs 525 from over compression that could lead to failure. In such examples the springs 525 and the raised portions 1005 cooperate to distribute the clamping pressure applied to the mold chase 110.

Figure 11:
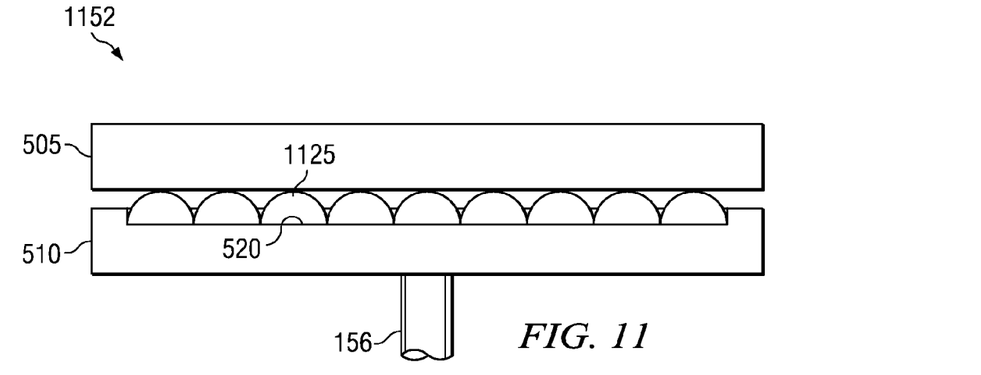
FIG. 11 illustrates another example mold base which may be employed in the example mold system of FIG. 1.

FIG. 11 illustrates another example split mold base 1152. In the example of FIG. 11, the springs are implemented by spring fingers 1125 seated in a common recess. The spring fingers 1125 may be implemented by any type of material that allows the spring fingers 1125 to resiliently compress (e.g., beryllium copper, etc.). The spring fingers 1125 distribute the clamping pressure applied to the mold chase 110.

Figure 12:
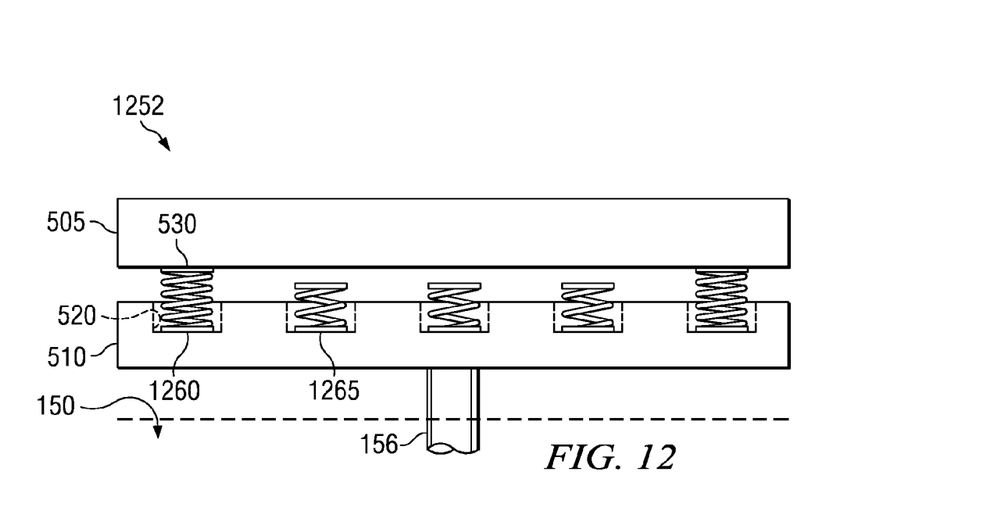
FIG. 12 illustrates another example mold base which may be employed in the example mold system of FIG. 1.

FIG. 12 illustrates another example split mold base 1252. In the example of FIG. 12, the example split mold base 1252 includes one or more first springs 1260 and one or more second springs 1265. In the illustrated example, the first springs 1260 and second springs 1265 may have different compression characteristics. In such examples, the first springs 1260 may absorb more clamping pressure than the second springs 1265, thereby allowing the clamping pressure to be distributed with greater accuracy. Though the example of FIG. 12 illustrates the different compression characteristics by illustrating the springs 1260, 1265 with different heights, any characteristic of the springs 1260 may be changed (e.g., length, material, tensile strength, coil radius, etc.) to achieve the desired compression differences.

In the foregoing examples, the example split mold base(s) prevent defective manufacturing of integrated circuits in a transfer mold process. The split mold base provides balanced clamping pressure to the mold chase to compensate for over-clamping pressure or under-clamping pressure or both. As a result, the mold base increases the efficiency of the molding process by producing higher quality packaged integrated circuits that are less likely to break and do not suffer from flash damage (i.e., epoxy bleed onto the leads of the packaged integrated circuit). In addition, the split mold base reduces maintenance of the mold chases by not requiring any shimming. Though the examples described are implemented on packaged integrated circuits having leads, the examples may be implemented into any suitable process (e.g., injection molding, transfer molding of leadless packaged integrated circuits, transfer molding of ball grid array packaged integrated circuits, etc.).

Although certain methods, systems, and articles of manufacture have been described herein, the scope of coverage of this patent is not limited thereto. To the contrary, this patent covers all methods, systems, and articles of manufacture fairly falling within the scope of the appended claims either literally or under the doctrine of equivalents.

What is claimed is:

1. A method of encapsulating an integrated circuit, comprising:
   placing a substrate having an integrated circuit attached thereon into a molding apparatus; the molding apparatus including:
      a first plate having a first surface;
      a second plate having a second surface opposite the first surface;
      a third rectangular plate having a center point supported by a supporting hydraulic cylinder at a support location at the center point; and
      springs disposed non-uniformly between the second plate and third rectangular plate, with density of the springs decreasing from near the support location to the short edges of the third rectangular plate, causing the first surface and the second surface to be in substantially uniform contact with the substrate; and
   encapsulating the integrated circuit with a molding compound.

2. The method as defined in claim 1, further comprising the step of clamping the substrate by forcing the first plate and the second plate to move toward each other.

3. A method of encapsulating an integrated circuit, comprising:
   inserting a substrate having an integrated circuit attached thereon into a cavity in a molding apparatus, the molding apparatus including:
      a first plate having a first surface;
      a second plate having a second surface opposite the first surface; the cavity located between the first surface and the second surface; a third rectangular plate having a center point supported by a supporting hydraulic cylinder at a support location at the center point; and
      springs disposed non-uniformly between the second plate and third rectangular plate, with density of the springs decreasing from near the support location to the short edges of the third rectangular plate;
   moving the supporting hydraulic cylinder, causing the first plate and the second plate to contact the substrate with substantially uniform force; and
   encapsulating the integrated circuit with a molding compound.

4. The method of claim 3, in which the springs comprise at least one of a disc spring, a disc spring, a coil spring, a spring finger and an elastomer.

5. The method of claim 1, in which the springs comprise at least one of a disc spring, a coil spring, a spring finger and an elastomer.

6. A method of encapsulating an integrated circuit, comprising:
   inserting a substrate having an integrated circuit attached thereon into a cavity in a mold chase, the mold chase including:
      a first plate having a first surface;
      a second plate having a second surface opposite the first surface;
      the cavity located between the first surface and the second surface;
      a third rectangular plate having a center point and connecting the second plate by springs;
      a supporting cylinder supporting the third rectangular plate at a support location near the center point; and
      springs disposed non-uniformly between the second plate and third rectangular plate, with density of springs decreasing from near the support location to the short edges of the third rectangular plate;
   moving the supporting cylinder, causing the first plate and the second plate to contact the substrate with substantially uniform force; and
   encapsulating the integrated circuit with a molding compound.

7. The method of claim 6, in which the supporting cylinder is a hydraulic cylinder.

8. The method of claim 6, in which the springs comprise at least one of a disc spring, a coil spring, a spring finger and an elastomer.

* * * * *